United States Patent [19]
Tung et al.

[11] Patent Number: 5,523,361
[45] Date of Patent: Jun. 4, 1996

[54] PROCESS FOR CRYSTALLIZING POLYETHYLENE NAPHTHALATE

[75] Inventors: William C. T. Tung, Tallmadge; Samuel M. Moats, Stow; Patrick J. Pesata, Medina, all of Ohio

[73] Assignee: Shell Oil Company, Houston, Tex.

[21] Appl. No.: 521,896

[22] Filed: Aug. 31, 1995

[51] Int. Cl.$^6$ .................................................. C08F 20/00
[52] U.S. Cl. ..................... 525/439; 528/272; 528/298; 528/308; 528/308.6; 525/437; 525/486; 525/503
[58] Field of Search .................................. 528/272, 298, 528/308, 308.6; 525/437, 439, 486, 503

[56] References Cited

U.S. PATENT DOCUMENTS

| | | | |
|---|---|---|---|
| 2,863,854 | 12/1958 | Wilson | 260/75 |
| 4,171,422 | 10/1979 | Lazarus et al. | 528/437 |
| 4,348,314 | 9/1982 | Lazarus et al. | 525/439 |
| 4,374,961 | 2/1983 | Kudo et al. | 525/439 |
| 4,963,644 | 10/1990 | Duh | 528/272 |
| 4,996,269 | 2/1991 | Richeson et al. | 525/444 |
| 5,290,913 | 3/1994 | McAllister et al. | 528/483 |

OTHER PUBLICATIONS

Huntsman brochure, "JEFFSOL® Ethylene and Propylene Carbonates," p. 6.

*Primary Examiner*—Samuel A. Acquah

[57] ABSTRACT

Polyethylene naphthalate pellets coated with an alkylene carbonate such as ethylene carbonate or propylene carbonate crystallize more quickly and at lower temperature than uncoated pellets, reducing the tendency of the pellets to stick together during the crystallization process prior to solid-state polymerization.

18 Claims, No Drawings

PROCESS FOR CRYSTALLIZING POLYETHYLENE NAPHTHALATE

BACKGROUND OF THE INVENTION

Polyethylene naphthalate (PEN) is a polyester useful in film, fiber and packaging applications. High molecular weight PEN is produced in a two-step process involving (a) melt polymerization to a relatively low molecular weight, amorphous polymer and (b) solid-state polymerization of this polymer to a high molecular weight polyester. The amorphous polymer is generally formed into the shape of pellets or chips for favorable solid-state reaction rates.

It is desirable to convert the amorphous PEN polymer to the crystalline state prior to solid-state polymerization, because the sticking temperature of the crystalline polymer is higher than that of the amorphous polymer, and use of the crystalline material will thus reduce the tendency of the pellets to stick together as a solid mass during solid-state polymerization.

The crystallization process involves heating the amorphous PEN polymer to its crystallization temperature (about 180°–200° C.). As the temperature is raised, however, the polymer passes through its sticking temperature (about 140° C.). In comparison with other polyesters such as polyethylene terephthalate, PEN pellets crystallize rather slowly, and clumping of the pellets will often occur before the crystallization process is complete.

It is therefore an object of the invention to provide a PEN crystallization process which lowers the crystallization temperature and avoids the problem of sticking or clumping of the PEN pellets.

SUMMARY OF THE INVENTION

According to the invention, polyethylene naphthalate is coated with an alkylene carbonate such as ethylene carbonate or propylene carbonate prior to crystallization. The carbonate-coated PEN pellets crystallize more rapidly and at a lower temperature than uncoated PEN, reducing the tendency of the pellets to stick together during the crystallization process.

DETAILED DESCRIPTION OF THE INVENTION

The invention process is designed for treatment of naphthalate-based aromatic polyesters, by which is meant polyesters having aromatic groups in the polymer chain at least a portion of which are naphthalate units. The invention process is particularly suitable for two classes of polyethylene naphthalates: those having 75 or more mole percent naphthalate units and those having 25 or less mole percent naphthalate units, based on total aromatic units in the polyester.

PEN polyesters can be prepared by condensation polymerization of the esterification reaction product of one or more aromatic dicarboxylic acids, at least one of which is a naphthalate-based acid such as 2,6-naphthalene dicarboxylic acid, and an alkylene diol such as ethylene glycol. Alternatively, the polymerization starting material can be prepared by the transesterification reaction of a naphthalate-based ester such as 2,6-dimethyl naphthalate and an alkylene diol, catalyzed with a suitable catalyst such as manganese acetate.

PEN copolyesters can be prepared by including other acids and/or diols in the polymerization mixture, such as an alkylene diol such as 1,3-propylene diol, 1,4-butylene diol, diethylene glycol and the like, and an aromatic acid (or alkyl ester thereof) such as terephthalic acid or isophthalic acid. The currently preferred PEN's are polyethylene naphthalate homopolyesters and polyethylene naphthalate/terephthalate copolyesters.

As used herein, "polyethylene naphthalates" (or "PEN") refers to polyesters and copolyesters which have aromatic units which include, but are not necessarily limited to, naphthalate groups and alkylene groups which include, but are not necessarily limited to, ethylene groups.

The amorphous, relatively low molecular weight polymer (referred to herein as the "feed polymer" to solid-state polymerization) can be prepared under condensation polymerization conditions, generally in the presence of a polycondensation catalyst such as antimony trioxide or an organotitanate, at an elevated temperature and in a reduced pressure environment. The reaction is generally carried out to the point at which the reaction product can be easily pelletized, and then the reaction product is extruded in the desired pellet, cube, chip or other small particle form, which will be collectively referred to herein as "pellets."

The feed polymer pellets are then mixed with an alkylene carbonate such as, for example, ethylene carbonate or propylene carbonate. Preferably, the mixing conditions are such that the alkylene carbonate is distributed on the surface of the pellets. Although a uniform coating of the alkylene carbonate on the pellet surfaces is not required, it is desirable that mixing is accomplished so as to distribute the alkylene carbonate on the surface of essentially all the pellets. The alkylene carbonate will generally be present on the pellets in an amount effective to reduce the crystallization temperature of the polyester, generally within the range of about 0.1 to about 10, preferably about 0.5 to about 3, weight percent, based on the weight of the polyester.

The alkylene carbonate can be applied, for example, by placing the pellets in an aqueous solution of the alkylene carbonate and then removing the water by, for example, flash evaporation; by spraying the alkylene carbonate on the pellets; or by stirring a mixture of the pellets and solid alkylene carbonate. The preferred technique is to introduce the alkylene carbonate as an aqueous solution into the solid-state polymerization vessel, add the amorphous PEN feed polymer pellets, and blend the mixture while evaporating off the water. This process can be carried out prior to or simultaneously with devolatilization of the PEN polymer under reduced pressure and/or inert gas flow at an elevated temperature lower than the polymer crystallization temperature.

Crystallization of the feed polymer is carried out by heating the coated chips, preferably with stirring, to the crystallization temperature of the particular PEN, generally a temperature within the range of about 80° to about 180° C., preferably about 120° to about 170° C. In order to accomplish the objective of reducing the tendency of the pellets to stick together, it is generally sufficient for crystallization to occur at the pellet surface, characterized by haziness of the surface of the pellets. The presence of the alkylene carbonate generally reduces the time required for crystallization of the PEN polyester, so that crystallization can usually be accomplished within about 20 to about 60 minutes.

Solid-state polymerization is carried out by heating the crystalline pellets in a suitable solid-state reactor to a temperature greater than about 210° C. under reduced pressure and/or inert gas flow for a period which can vary widely depending upon the particular polymer but will generally be greater than 7 hours, often greater than 20 hours for PEN copolyesters, to achieve an intrinsic viscosity greater than that of the feed polymer, e.g., greater than about 0.5 dl/g for high-naphthalate polyesters and greater than about 0.6 for low-naphthalate copolyesters. In general, the invention crystallization process will not affect solid-stating conditions or the properties of the final polyester.

The solid-stated polyester can be used in a wide variety of applications, including molded bottles and trays.

EXAMPLE 1

This experiment illustrates the effect of coating PEN polyester pellets with ethylene carbonate and subjecting the pellets to crystallization conditions.

10 g of polyethylene terephthalate/naphthalate (10/90 T/N) pellets were coated with ethylene carbonate by mixing the PET/PEN with 0.15 g of ethylene carbonate in 0.85 g of water and boiling off the water. The coated pellets were introduced into a glass reactor heated to 141° C. and the pellets were stirred slowly. After five minutes, the pellets turned hazy, indicating crystallization. No sticking was observed.

In a control experiment, uncoated pellets of PET/PEN were stirred slowly at 141° C. The pellets had not crystallized after 5 minutes, and there was noticeable sticking together of the pellets.

EXAMPLE 2

10 g of PET/PEN (10/90 T/N) pellets were coated with propylene carbonate by mixing the pellets with 0.1 g of propylene carbonate in 0.4 g of water and boiling off the water. The coated pellets were introduced into a glass reactor and were stirred slowly at 150° C. After 5 minutes, the pellets turned hazy, indicating crystallization. The pellets were not sticking together.

In a control experiment, uncoated pellets of PET/PEN were stirred slowly at 150° C. The pellets had not crystallized after 5 minutes, and there was noticeable sticking together of the pellets.

EXAMPLE 3

This experiment demonstrates solid-state polymerization of coated and uncoated pellets of PEN.

A solid-state polymerization was run in a 3 cu. ft. blender using pelletized PET/PEN (10/90 T/N) feed polymer. 0.5 pounds of ethylene carbonate as an aqueous solution were charged to the blender, after which the feed polymer was charged. The feed polymer was devolatilized for 2 hours at 120° C. and then crystallized at 165° C. for 1 hour. The temperature of the blender was raised to 230° C. and held for 30 hours for solid-state polymerization.

In a control experiment, 50 pounds of PET/PEN (10/90 T/N) were charged to the blender with no ethylene carbonate. After devolatilization for 2 hours at 120° C. and crystallization at 165° C. for 1 hour, it was necessary to continue for another 1.5 hour at 190° C. to complete crystallization. The polymer was then solid-stated for 30 hours at 230° C. Polymerization rates were similar for the two polyesters, but there was very heavy sticking in the control.

EXAMPLE 4

This experiment demonstrates crystallization of PET/PEN pellets coated with ethylene carbonate.

33 g of PET/PEN (10/90 T/N) pellets were coated with 0.17 g of ethylene carbonate by mixing in a rotary flask of an evaporator/blender. The flask was immersed in a hot oil bath at 165° C. After 25 minutes, the pellets were significantly crystallized and there was little sticking.

The same experiment was carried out using uncoated PET/PEN pellets. Under the same conditions, there was less crystallinity and heavy sticking of the pellets.

EXAMPLE 5

This experiment demonstrates crystallization of PET/PEN pellets coated with propylene carbonate.

34 g of PET/PEN (10/90 T/N) pellets were coated with 0.17 g of propylene carbonate by mixing in a rotary flask. The flask was immersed in a hot oil bath at 150° C. After 30 minutes, there was some crystallization and little sticking.

The same experiment was carried out using uncoated PET/PEN pellets. There was little crystallization and considerable sticking of the pellets.

EXAMPLE 6

This experiment demonstrates crystallization of PET/PEN pellets coated with ethylene carbonate, in which the PET/PEN contains a relatively small molar quantity of naphthalate units.

30 g of PET/PEN (90/10 T/N) pellets were coated with 0.3 g of ethylene carbonate by mixing in a rotary flask of an evaporator/blender. The flask was immersed in a hot oil bath at 125° C. After 15 minutes, the pellets were significantly crystallized and there was little sticking.

The same experiment was carried out using uncoated PET/PEN pellets. Under the same conditions, there was less crystallinity and heavy sticking of the pellets.

We claim:

1. A process for crystallizing an amorphous aromatic polyester comprising naphthalate units, the process comprising:
    (a) mixing pellets of said polyester with an amount of an alkylene carbonate effective to reduce the temperature of crystallization of the polyester pellets; and
    (b) heating the mixture of alkylene carbonate and polyester pellets to a temperature of at least 80° C. under conditions effective to crystallize at least an outer portion of the polyester pellets.

2. The process of claim 1 in which the alkylene carbonate is selected from the group consisting of ethylene carbonate and propylene carbonate.

3. The process of claim 1 in which the alkylene carbonate is present in an amount within the range of about 0.1 to about 10 weight percent, based on the weight of the polyester.

4. The process of claim 1 in which the polyester is a polyethylene naphthalate/terephthalate copolyester.

5. The process of claim 1 in which the alkylene carbonate is present in an amount within the range of about 0.5 to about 3 weight percent, based on the weight of the polyester.

6. The process of claim 1 in which the alkylene carbonate is ethylene carbonate.

7. The process of claim 1 in which the aromatic polyester comprises at least about 75 mole percent naphthalate units, based on moles of aromatic units.

8. The process of claim 1 in which the aromatic polyester is polyethylene naphthalate.

9. The process of claim 1 in which step (b) comprises heating the mixture of alkylene carbonate and polyester pellets to a temperature within the range of about 120° to about 170° C. for a time within the range of about 20 to about 60 minutes.

10. The process of claim 1 in which the aromatic polyester comprises an amount of naphthalate units, based on moles of aromatic units, within the range of about 1 to about 25 percent.

11. A process for preparing a high molecular weight aromatic polyester comprising naphthalate units, the process comprising:

(a) preparing a relatively low molecular weight feed polymer by reacting ethylene glycol and 2,6-naphthalene dicarboxylic acid or an alkyl ester thereof under melt condensation polymerization conditions for a time sufficient to produce a molten polyethylene naphthalate feed polymer;

(b) solidifying the polyethylene naphthalate feed polymer, dividing said polymer into a plurality of pellets, and mixing the pellets with an alkylene carbonate so as to deposit the alkylene carbonate thereon;

(c) crystallizing at least an outer portion of said polyethylene naphthalate feed polymer pellets by exposing the pellets to a temperature within the range of about 80 to about 180° C.;

(d) solid-stating the crystallized polyethylene naphthalate feed polymer pellets at a temperature within the range of about 210° to 265° C. to produce a high molecular weight polyethylene naphthalate.

12. The process of claim 11 in which the alkylene carbonate is selected from the group consisting of ethylene carbonate and propylene carbonate.

13. The process of claim 11 in which the alkylene carbonate is present in an amount within the range of about 0.1 to about 10 weight percent, based on the weight of the feed polymer.

14. The process of claim 11 in which the polyester is a polyethylene naphthalate/terephthalate copolyester.

15. The process of claim 11 in which the alkylene carbonate is ethylene carbonate.

16. The process of claim 11 in which the aromatic polyester comprises at least about 75 mole percent naphthalate units, based on moles of aromatic units.

17. The process of claim 11 in which step (c) comprises heating the pellets to a temperature within the range of about 120° to about 170° C. for a time within the range of about 20 to about 60 minutes.

18. The process of claim 11 in which the aromatic polyester comprises an amount of naphthalate units, based on moles of aromatic units, within the range of about 1 to about 25 percent.

\* \* \* \* \*